(12) United States Patent
Ozeki

(10) Patent No.: US 10,359,121 B2
(45) Date of Patent: Jul. 23, 2019

(54) CONTROL VALVE

(71) Applicant: YAMADA MANUFACTURING CO., LTD., Kiryu, Gunma (JP)

(72) Inventor: Akifumi Ozeki, Kiryu (JP)

(73) Assignee: YAMADA MANUFACTURING CO., LTD., Kiryu-shi (JP)

( * ) Notice: Subject to any disclaimer, the term of this patent is extended or adjusted under 35 U.S.C. 154(b) by 0 days.

(21) Appl. No.: 15/789,160

(22) Filed: Oct. 20, 2017

(65) Prior Publication Data

US 2018/0119827 A1 May 3, 2018

(30) Foreign Application Priority Data

Oct. 27, 2016 (JP) ................... 2016-210705

(51) Int. Cl.
*F16K 11/07* (2006.01)
*F01P 5/12* (2006.01)
(Continued)

(52) U.S. Cl.
CPC ............ *F16K 11/0708* (2013.01); *F01P 5/12* (2013.01); *F01P 7/16* (2013.01); *F01P 7/165* (2013.01); *F01P 11/16* (2013.01); *F16K 11/085* (2013.01); *F16K 27/065* (2013.01); *F16K 31/041* (2013.01); *F01P 2007/146* (2013.01); *F01P 2060/04* (2013.01); *F01P 2060/08* (2013.01); *F01P 2060/16* (2013.01); *F28F 25/02* (2013.01); *F28F 27/02* (2013.01)

(58) Field of Classification Search
CPC .. F16K 11/0708; F16K 31/041; F16K 27/065; F16K 11/085; F01P 7/16; F01P 5/12; F01P 11/16; F01P 2007/146; F28F 27/02; F28F 25/02
See application file for complete search history.

(56) References Cited

U.S. PATENT DOCUMENTS

2014/0238073 A1* 8/2014 Ohno ................. F16K 11/0856
62/498
2016/0003126 A1* 1/2016 Carns ....................... F01P 7/14
123/41.44
(Continued)

FOREIGN PATENT DOCUMENTS

JP 2015-121207 7/2015
JP 2015-218852 12/2015

*Primary Examiner* — Hung Q Nguyen
(74) *Attorney, Agent, or Firm* — Rankin, Hill & Clark LLP

(57) ABSTRACT

A control valve includes a casing having an inlet port for a fluid, an axially rotatable valve accommodated in the casing and having a flow path communicating with the inlet port. An upstream outlet port and a downstream outlet port passing through the casing are formed at intervals in the casing. An upstream communication port and a downstream communication port, which respectively communicate between an inside of the flow path and the upstream outlet port and between the inside of the flow path and the downstream outlet port according to a rotational position of the valve are formed in the valve. A flowing direction changing portion for changing a flowing direction of the fluid in the flow passage is provided in a portion of the flow path which is located on a downstream side in relation to the upstream communication port in the flowing direction of the fluid.

7 Claims, 10 Drawing Sheets

(51) Int. Cl.
*F01P 7/16* (2006.01)
*F01P 11/16* (2006.01)
*F16K 11/085* (2006.01)
*F16K 27/06* (2006.01)
*F16K 31/04* (2006.01)
*F01P 7/14* (2006.01)
*F28F 25/02* (2006.01)
*F28F 27/02* (2006.01)

(56) References Cited

U.S. PATENT DOCUMENTS

2016/0040585 A1* 2/2016 Schaefer .................. F01P 3/20
                                                    137/1
2016/0258340 A1* 9/2016 Klippert .................... F01P 5/10
2016/0273671 A1* 9/2016 Chang ...................... F01P 7/14
2016/0281585 A1* 9/2016 Muizelaar ................. F01P 7/14

\* cited by examiner

CONTROL VALVE

BACKGROUND OF THE INVENTION

Field of the Invention

The present invention relates to a control valve.

Priority is claimed on Japanese Patent Application No. 2016-210705, filed Oct. 27, 2016, the content of which is incorporated herein by reference.

Description of Related Art

In a cooling system which cools an engine using cooling water, a bypass flow path which bypasses a radiator, a warming flow path which passes through an oil warmer, and so on may be provided separately from a radiator flow path which circulates between the radiator and the engine. In such a cooling system, there is provided a control valve for controlling a flow of the cooling water to the radiator flow path, the bypass flow path, the warming flow path and so on (for example, Japanese Unexamined Patent Application, First Publication No. 2015-121207).

According to such a configuration, by switching the flow of the cooling water according to a temperature of the cooling water or the like, it is possible to improve fuel efficiency by early temperature rise, high water temperature (optimal temperature) control, and so on.

For the above-described control valve, a configuration including a cylindrical casing having an inflow port for the cooling water and a cylindrical valve disposed coaxially with the casing in the casing and configured to be rotatable around an axis is known (for example, Japanese Unexamined Patent Application, First Publication No. 2015-218852).

An outlet port passing through the casing in a radial direction is formed in the casing. A plurality of outlet ports are formed at intervals in an axial direction of the casing.

A flow path through which the cooling water flowing into the casing flows in the axial direction is formed inside of the valve. A plurality of communication ports are formed in the valve. Each of the communication ports allows the flow path and each of the above-described outlet ports to communicate according to rotation of the valve.

According to such a configuration, communication and shut-off between the outlet port and the communication port are switched by rotating the valve. The cooling water flowing into the control valve flows out from the control valve through the outlet port communicating with the communication port in a process of flowing through the flow path. Accordingly, the cooling water flowing into the control valve is distributed to one or a plurality of flow paths according to the rotation of the valve.

However, in the prior art described above, when a plurality of outlet ports and a plurality of communication ports communicate with each other, it is difficult to distribute cooling water with a desired flow rate to a plurality of locations through each of the outlet ports (communication ports). That is, when the plurality of outlet ports (communication ports) are arranged in a flowing direction of the cooling water, the cooling water flowing through the flow path easily flows out through the outlet port (communication port) located on a downstream side among the outlet ports (communication ports). Therefore, it is difficult to distribute a desired flow rate of cooling water to the outlet port (communication port) located on an upstream side among the outlet ports (communication ports).

In this regard, for example, making an opening area of the outlet port (communication port) located on the upstream side among the outlet ports (communication ports) larger than an opening area of the outlet port (communication port) on the downstream side can be considered.

However, when the opening area of the outlet port (communication port) is increased, there is a possibility of leading an increase in size of the control valve, or the like.

SUMMARY OF THE INVENTION

The present invention provides a control valve capable of distributing cooling water of a desired flow rate through each communication port and outlet port while an increase in size is suppressed.

According to a first aspect of the present invention, there is provided a control valve including a cylindrical casing having an inlet port for a fluid, a valve accommodated in the casing to be rotatable around an axis extending in an axial direction of the casing and having a flow path communicating with the inlet port to allow the fluid to flow therethrough, wherein an upstream outlet port and a downstream outlet port passing through the casing are formed at intervals in the casing, an upstream communication port and a downstream communication port which allow communication between an inside of the flow path and the upstream outlet port and between the inside of the flow path and the downstream outlet port according to a rotational position of the valve are formed in the valve, and a flowing direction changing portion for changing a flowing direction of the fluid in the flow passage is provided in a portion of the flow path which is located on a downstream side in relation to the upstream communication port in the flowing direction of the fluid.

According to the first aspect of the present invention, since the flowing direction of the fluid is changed by the flowing direction changing portion in a process in which the fluid flows in the flow path on the downstream side in relation to the upstream communication port, a pressure loss at a portion of the flow path leading to the downstream communication port increases. Therefore, it is possible to make it difficult for the fluid to flow to a downstream side of the flow passage in relation to the upstream communication port, and it is possible to actively introduce the fluid to the upstream communication port. Accordingly, in particular, when a plurality of communication ports and outlet ports communicate with each other, the fluid can be effectively introduced into the upstream communication port. As a result, it is possible to distribute a desired flow rate of cooling water to each of the communication ports and the outlet ports.

Also, according to the first aspect of the present invention, since the above-described operational effects are obtained by changing the flowing direction of the fluid, it is possible to suppress an increase in size of the control valve as compared with, for example, a case in which the upstream communication port is formed to be larger than the downstream communication port.

According to a second aspect of the present invention, the flow path may have an upstream flow path through which the fluid flows from a first end side in the axial direction toward a second end side and which communicates with the upstream communication port, and a downstream flow path which is connected to a portion of the upstream flow path on the second end side in the axial direction, through which the fluid flows from the second end side to the first end side in the axial direction, and which communicates with the downstream communication port, and the flowing direction changing portion may be a return wall portion which divides the upstream flow path from the downstream flow path and turns the flowing direction at a connecting portion between the upstream flow path and the downstream flow path.

According to the second aspect, since the fluid is returned at a portion of the return wall portion on the second end side in the axial direction, the pressure loss in the portion of the flow path from the upstream communication port to the downstream communication port is increased. Accordingly, the above-described operational effects are achieved more successfully.

According to a third aspect of the present invention, the flowing direction changing portion may be a restriction wall portion which restricts the flow of the fluid to the downstream side in the flow path on the downstream side in the flow direction in relation to the downstream communication port.

According to the third aspect, the flow of the fluid to the downstream side in relation to the restriction wall portion is restricted by the restriction wall portion. Therefore, the pressure loss on the downstream side of an inside of the flow path in relation to the upstream communication port is increased. Therefore, the above-described operational effects are achieved more successfully.

According to a fourth aspect of the present invention, a flow path cross-sectional area of a portion of the flow path which is located between the upstream communication port and the downstream communication port may be formed to be equal to or more than an opening area of the downstream communication port.

According to the fourth aspect, since the flow path cross-sectional area of the portion of the flow path located between the upstream communication port and the downstream communication port is equal to or larger than the opening area of the downstream communication port, the flow rate of the fluid flowing toward the downstream communication port can be secured. Accordingly, it is possible to more reliably distribute a desired flow rate of cooling water to each of the communication ports and the outlet ports.

According to a fifth aspect of the present invention, the upstream outlet port may be connected to a radiator of a vehicle.

According to the fifth aspect, it is possible to effectively introduce the cooling water into the radiator even when a plurality of communication ports and outlet ports communicate with each other.

According to a sixth aspect of the present invention, each of the upstream outlet port and the downstream outlet port may pass through the casing in a radial direction, and each of the upstream communication port and the downstream communication port may pass through the valve in the radial direction.

According to the sixth aspect, it is possible to improve layout properties of the communication ports and the outlet ports as compared with, for example, the case in which the communication ports and the outlet ports respectively pass through the valve and the casing in the axial direction, respectively.

According to the control valve, it is possible to distribute the cooling water of the desired flow rate through each communication port and outlet port while suppressing an increase in size.

DETAILED DESCRIPTION OF EMBODIMENTS

Next, an embodiment of the present invention will be described on the basis of the drawings. In the following description, a case in which a control valve of the present embodiment is adopted in a cooling system which cools an engine using cooling water will be described.
[Cooling System]
FIG. 1 is a block diagram of a cooling system 1.

Figure 1:
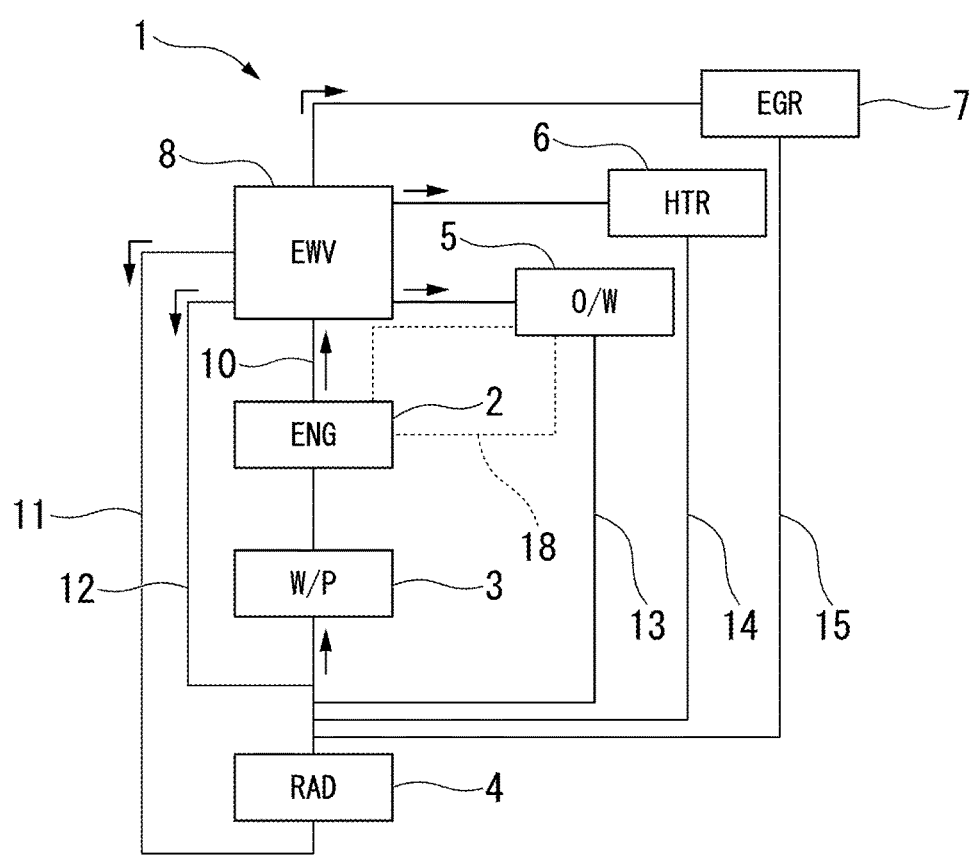
FIG. 1 is a block diagram of a cooling system according to an embodiment.

As illustrated in FIG. 1, the cooling system 1 is mounted in a vehicle having at least an engine as a vehicle driving source. Also, in addition to a vehicle having only an engine, a hybrid vehicle, a plug-in hybrid vehicle, or the like may be used as the vehicle.

The cooling system 1 includes an engine (ENG) 2, a water pump (W/P) 3, a radiator (RAD) 4, an oil warmer (O/W) 5, a heater core (HTR) 6, an EGR cooler (EGR) 7, and a control valve (EWV) 8 which are connected through various flow paths 10 to 15.

The water pump 3, the engine 2 and the control valve 8 are connected, in turn, from upstream to downstream on a main flow path 10. In the main flow path 10, the cooling water passes through the engine 2 and the control valve 8, in turn, due to an operation of the water pump 3.

A radiator flow path 11, a bypass flow path 12, a warming flow path 13, an air-conditioning flow path 14 and an EGR flow path 15 are respectively connected to the main flow path 10. The radiator flow path 11, the bypass flow path 12, the warming flow path 13, the air-conditioning flow path 14 and the EGR flow path 15 connect an upstream portion of the water pump 3 in the main flow path 10 with the control valve 8.

The radiator 4 is connected to the radiator flow path 11. In the radiator flow path 11, heat exchange between the cooling water and external air is performed in the radiator 4.

The bypass flow path 12 is a flow path which bypasses the radiator 4.

The oil warmer 5 is connected to the warming flow path 13. Engine oil circulates through an oil flow path 18 between the oil warmer 5 and the engine 2. In the warming flow path 13, heat exchange between the cooling water and the engine oil is performed in the oil warmer 5. Further, in the embodiment, a heat exchanger is used as the "oil warmer 5" in view of improvement of fuel economy and early warm-up, but an oil temperature may be higher than a water temperature according to operating conditions. When the oil temperature is higher than the water temperature, the heat exchanger is used as an "oil cooler".

The heater core 6 is connected to the air-conditioning flow path 14. The heater core 6 is provided, for example, in a duct (not illustrated) of an air conditioner. In the air-conditioning flow path 14, heat exchange between the cooling water and conditioned air flowing through the duct is performed in the heater core 6.

The EGR cooler 7 is connected to the EGR flow path 15. In the EGR flow path 15, heat exchange between the cooling water and an EGR gas is performed in the EGR cooler 7.

In the cooling system 1 described above, the cooling water having passed through the engine 2 in the main flow path 10 flows into the control valve 8 and is then selectively distributed to the various flow path 11 to 15 by the operation of the control valve 8. Therefore, early temperature rise, high water temperature (optimal temperature) control or the like can be realized, and improvement of the fuel economy in the vehicle is promoted.

<Control Valve>

Figure 2:
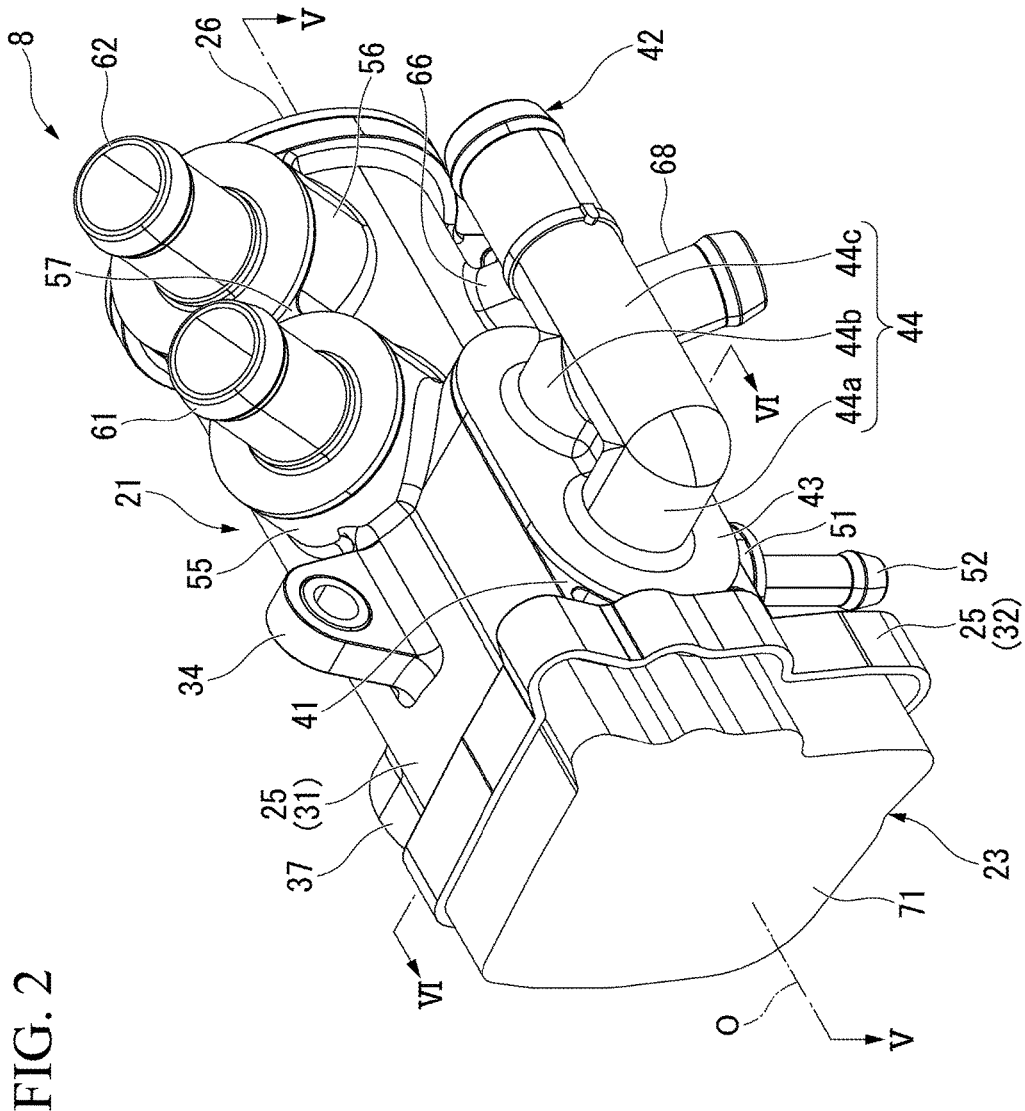
FIG. 2 is a perspective view of a control valve according to the embodiment.
Figure 3:
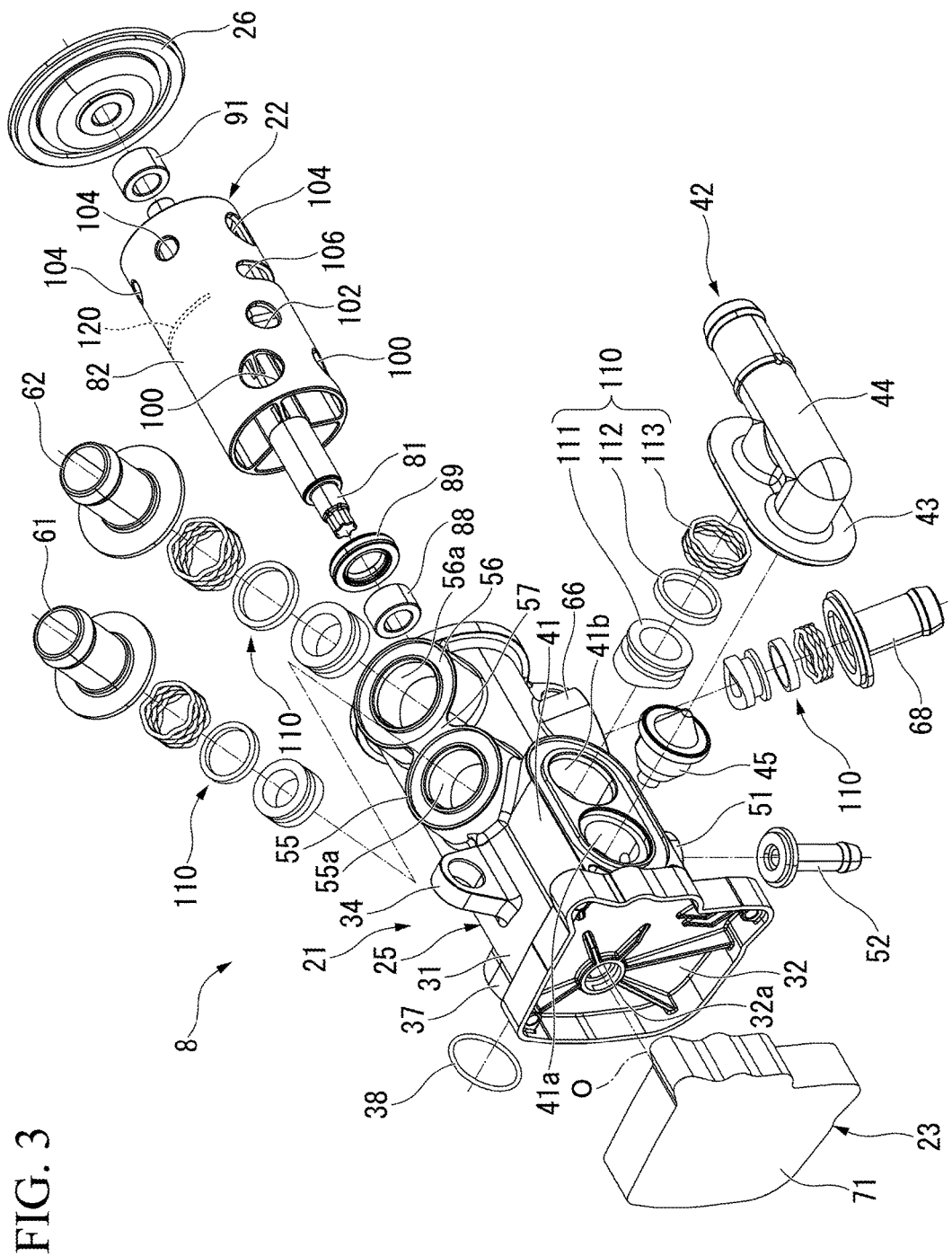
FIG. 3 is an exploded perspective view of the control valve according to the embodiment.

FIG. 2 is a perspective view of the control valve 8. FIG. 3 is an exploded perspective view of the control valve 8.

As illustrated in FIGS. 2 and 3, the control valve 8 mainly includes a casing 21, a valve 22 and a drive unit 23.

(Casing)

The casing 21 has a bottomed cylindrical casing main body 25 and a cover body 26 which closes an opening of the casing main body 25. Further, in the following description, a direction along an axis O of the casing 21 is simply referred to as an axial direction. With respect to a circumferential wall portion 31 of the casing main body 25, a direction toward a bottom wall portion 32 of the casing main body 25 is referred to as a first end side, and with respect to the circumferential wall portion 31 of the casing main body 25, a direction toward the cover body 26 is referred to as a second side. A direction orthogonal to the axis O is referred to as a radial direction, and a direction around the axis O is referred to as a circumferential direction. In the embodiment, a surface area of the circumferential wall portion 31 is formed to be larger than that of the bottom wall portion 32 or the cover body 26. That is, the casing 21 is formed in a cylindrical shape which is long in the axial direction.

Figure 4:
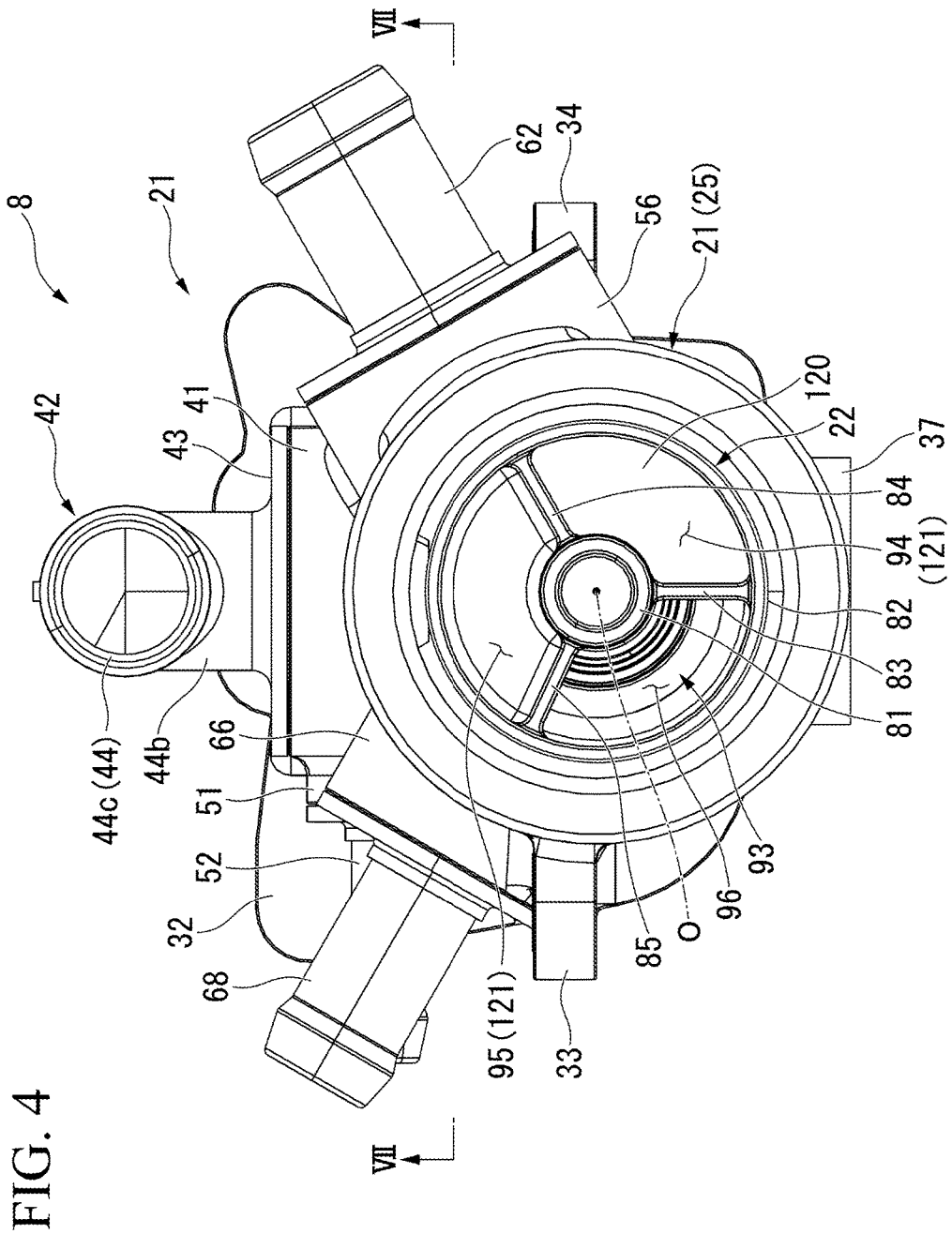
FIG. 4 is a front view of the control valve according to the embodiment as seen from a second end side in an axial direction while a cover body is removed.

FIG. 4 is a front view of the control valve 8 as seen from the second end side in the axial direction while the cover body 26 is removed.

The casing main body 25 and the cover body 26 illustrated in FIG. 4 are formed of, for example, a resin material or the like.

Installation pieces (a first installation piece 33 and a second installation piece 34) are formed on the circumferential wall portion 31 of the casing main body 25. Each of the installation pieces 33 and 34 protrudes radially outward from the circumferential wall portion 31. The installation pieces 33 and 34 are formed at positions facing each other in the radial direction having the axis O of the circumferential wall portion 31 therebetween. In the embodiment, first installation pieces 33 are located at both axial ends of the circumferential wall portion 31 (refer to FIG. 7). As illustrated in FIG. 2, the second installation piece 34 is located on the first end side with respect to a center portion in the axial direction of the circumferential wall portion 31. The control valve 8 is fixed in an engine space using, for example, each of the installation pieces 33 and 34. Further, the position, the number and so on of each of the installation pieces 33 and 34 can be appropriately changed.

Figure 5:
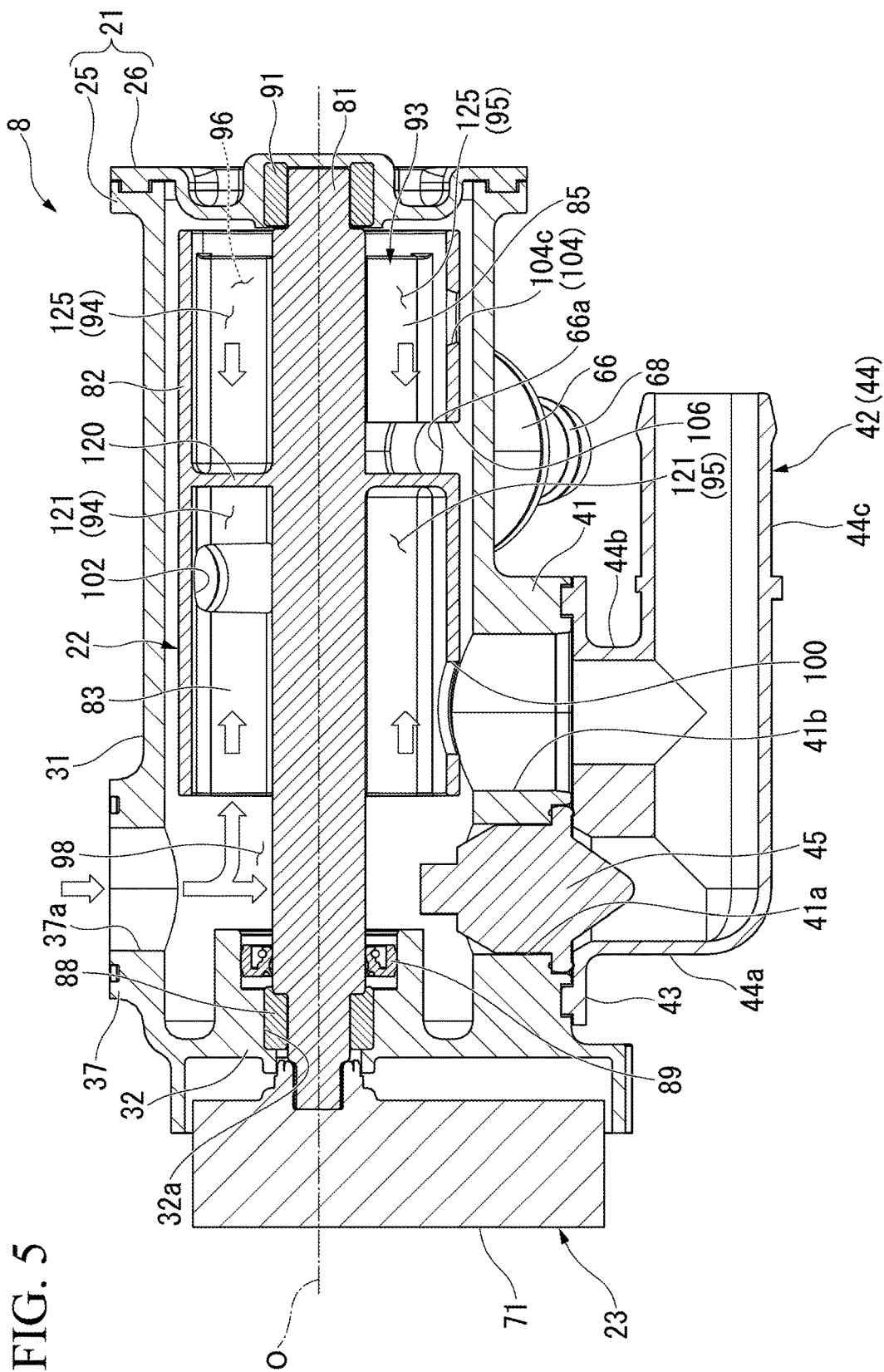
FIG. 5 is a cross-sectional view taken along line V-V of FIG. 2.

FIG. 5 is a cross-sectional view taken along line V-V of FIG. 2.

As illustrated in FIGS. 4 and 5, an inflow port 37 extending outward in the radial direction is formed in a portion of the circumferential wall portion 31 on the first end side in the axial direction. The inflow port 37 is formed at a position on the circumferential wall portion 31 which deviates from the installation pieces 33 and 34 by, for example, 90° in a circumferential direction. An inlet port 37a which passes through the inflow port 37 in the radial direction is formed in the inflow port 37. The inlet port 37a allows an inside and outside of the casing 21 to communicate.

The above-described main flow path 10 (refer to FIG. 1) is connected to an opening end surface (radially outer end surface) of the inflow port 37 having an O-ring 38 therebetween (refer to FIG. 3). Further, the opening end surface of the inflow port 37 is formed as a flat surface orthogonal to the radial direction.

As illustrated in FIG. 5, a radiator port 41 extending outward in the radial direction is formed at a position on the circumferential wall portion 31 which faces the inflow port 37 in the radial direction having the axis O therebetween.

The radiator port 41 is formed in an elliptical shape of which a long-length direction is the axial direction in a side view when seen from the radial direction. In the radiator port 41, a fail opening 41a and a radiator outlet port 41b are formed side by side in the axial direction. The fail opening 41a and the radiator outlet port 41b respectively pass through the radiator port 41 in the radial direction. In the embodiment, the fail opening 41a faces the above-described inlet port 37a in the radial direction. The radiator outlet port 41b is located on the second end side of the fail opening 41a in the axial direction. Further, an inner diameter of each of the fail opening 41a and the radiator outlet port 41b are formed to be equal.

An opening end surface (radially outer end surface) of the radiator port 41 is a flat surface orthogonal to the radial direction. Therefore, the opening end surface of the radiator port 41 and the above-described opening end surface of the inflow port 37 extend in parallel to each other. However, as long as the radiator port 41 and the inflow port 37 are disposed at positions which face each other in the radial direction, the opening end surface of the radiator port 41 and the opening end surface of the inflow port 37 may be disposed to be slightly inclined with respect to each other.

A radiator joint 42 is connected to the opening end surface (radially outer end surface) of the radiator port 41. The radiator joint 42 connects the radiator port 41 and the radiator flow path 11 (refer to FIG. 1). The radiator joint 42 has a flange portion 43 and a radiator supply pipe 44.

The flange portion 43 has an elliptical shape which is formed in the same shape as the opening end surface of the radiator port 41. That is, the flange portion 43 surrounds the fail opening 41a and the radiator outlet port 41b. The flange portion 43 is welded (for example, vibration welding or the like) to the opening end surface of the radiator port 41. That is, the opening end surface of the radiator port 41 and a radially inner end surface of the flange portion 43 are welded surfaces, respectively.

The radiator supply pipe 44 extends outward from the flange portion 43 in the radial direction and then extends toward the second end side in the axial direction. Specifically, the radiator supply pipe 44 includes a fail communication portion 44a, a radiator communication portion 44b, and a merging portion 44c.

The fail communication portion 44a extends radially outward from a position on the flange portion 43 overlapping with the fail opening 41a as seen in the radial direction. An inside of the fail communication portion 44a is capable of communicating with the fail opening 41a.

The radiator communication portion 44b extends radially outward from a position on the flange portion 43 overlapping with the radiator outlet port 41b as seen in the radial direction. An inside of the radiator communication portion 44b communicates with the radiator outlet port 41b.

The merging portion 44c extends in the axial direction. A portion of the merging portion 44c on the first end side in the axial direction is collectively connected to a radially outer end of each of the communication portions 44a and 44b. An upstream end of the above-described radiator flow path 11 (refer to FIG. 1) is connected to a portion of the merging portion 44c on the second end side in the axial direction. Further, the radiator supply pipe 44 may collectively communicate with the fail opening 41a and the radiator outlet port 41b as long as a welding area between the radiator port 41 and the flange portion 43 is secured.

A thermostat 45 is provided in the fail opening 41a. The thermostat 45 opens and closes the fail opening 41a according to a temperature of the cooling water flowing in the casing 21. When the temperature of the cooling water is equal to or higher than a predetermined temperature, the thermostat 45 opens the fail opening 41a and allows the fail opening 41a and the inside of the fail communication portion 44a to communicate with each other. In the embodiment, for example, the thermostat 45 is of a wax pellet type. That is, in the thermostat 45, a valve body is operated using thermal expansion of a wax filled into a thermo-element. The thermostat 45 closes the fail opening 41a with the valve body by that a mounted flange portion is interposed between the opening end surface of the radiator port 41 and the flange portion 43. The thermo-element of the thermostat 45 faces the inlet port 37a in the casing 21 in the radial direction. Further, in the embodiment, the configuration in which the fail opening 41a and the inlet port 37a are coaxially arranged has been described. However, embodiments of the present invention is not limited to this configuration, and at least a part of the fail opening 41a and the inlet port 37a may overlap with each other when seen from the radial direction.

Figure 6:
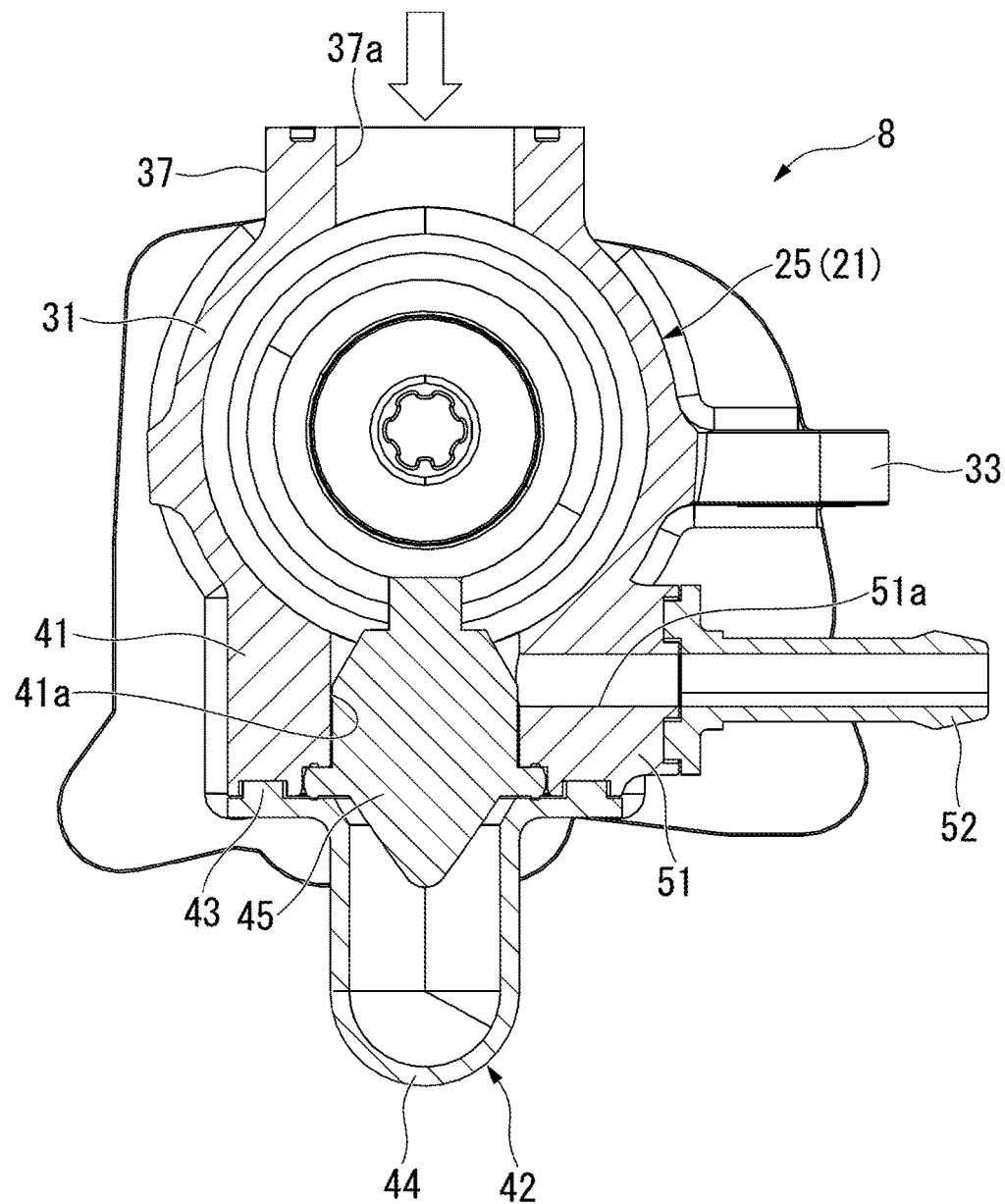
FIG. 6 is a cross-sectional view taken along line VI-VI of FIG. 2.

FIG. 6 is a cross-sectional view taken along line VI-VI in FIG. 2.

As illustrated in FIG. 6, an EGR port 51 is formed at a position on the radiator port 41 which is equivalent to that of the above-described fail opening 41a in the axial direction. The EGR port 51 bulges in a direction orthogonal to an opening direction of the fail opening 41a (the same direction as that of the first installation piece 33). An EGR outlet port 51a communicating with the inside of the radiator port 41 (the fail opening 41a) is formed in the EGR port 51. The EGR outlet port 51a extends in a bulging direction of the EGR port 51 (the direction orthogonal to the opening direction of the fail opening 41a). Further, an opening direction of the EGR outlet port 51a may be opening in a direction crossing the opening direction of the fail opening 41a (direction different from the opening direction of the fail opening 41a). The EGR port 51 (EGR outlet port 51a) may be located at a position which axially deviates from the fail opening 41a as long as it is adjacent to the fail opening 41a.

An EGR joint 52 is connected to the opening end surface of the EGR port 51. The EGR joint 52 connects the EGR port 51 and an upstream end of the above-described EGR flow path 15 (refer to FIG. 1). Also, the EGR joint 52 is welded (for example, vibration welding or the like) to the opening end surface of the EGR port 51.

As illustrated in FIG. 2, a bypass port 55 and a warming port 56 are formed in a portion of the circumferential wall portion 31 on the second end side in the axial direction located between the radiator port 41 and the second installation piece 34 in the circumferential direction. The bypass port 55 and the warming port 56 are formed side by side in the axial direction. Each of the ports 55 and 56 bulges in a direction of the radial direction intersecting each other in the bulging direction of the radiator port 41 and the second installation piece 34 (direction of the radial direction different from the bulging direction of each of the radiator port 41 and the second installation piece 34). A connecting portion 57 which connects the ports 55 and 56 in the axial direction is formed at a portion of the circumferential wall portion 31 between the ports 55 and 56. A width of the connecting portion 57 in the circumferential direction is formed to be narrower than that of each of the ports 55 and 56, and a radially outward bulging amount is equal to that of each of the ports 55 and 56.

Figure 7:
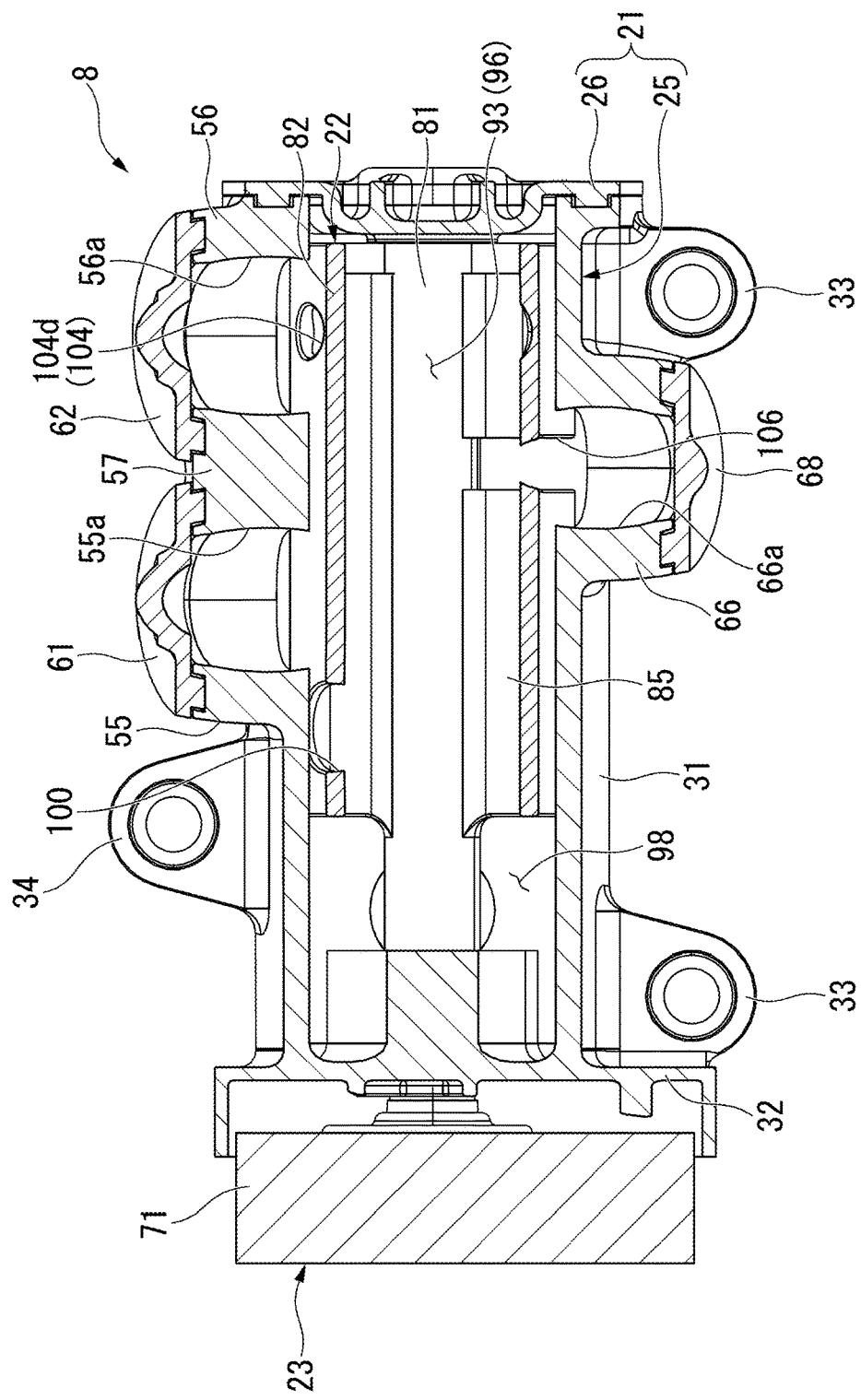
FIG. 7 is a cross-sectional view taken along line VII-VII of FIG. 4.

FIG. 7 is a cross-sectional view taken along line VII-VII of FIG. 4.

As illustrated in FIG. 7, the bypass port 55 is disposed on the first end side in the axial direction of the warming port 56. A bypass outlet port 55a passing through the bypass port 55 in the radial direction is formed in the bypass port 55. As illustrated in FIG. 2, a bypass joint 61 is connected to the opening end surface (radially outer end surface) of the bypass port 55. The bypass joint 61 connects the bypass port 55 and an upstream end of the above-described bypass flow path 12 (refer to FIG. 1). The bypass joint 61 protrudes radially outward from an opening end surface of the bypass port 55. Further, the bypass joint 61 is welded (for example, vibration welding or the like) to the opening end surface of the bypass port 55.

As illustrated in FIG. 7, a warming outlet port 56a passing through the warming port 56 in the radial direction is formed at the warming port 56. A warming joint 62 is connected to an opening end surface (radially outer end surface) of the warming port 56. As illustrated in FIG. 2, the warming joint 62 connects the warming port 56 and an upstream end of the above-described warming flow path 13 (refer to FIG. 1). The warming joint 62 protrudes radially outward from the opening end surface of the warming port 56. The warming joint 62 is welded (for example, vibration welding or the like) to the opening end surface of the warming port 56. Further, the bypass port 55 and the warming port 56 may be disposed to be displaced from each other in the circumferential direction.

As illustrated in FIG. 4, an air-conditioning port 66 is formed in a portion of the circumferential wall portion 31 on the second end side in the axial direction which is located between the radiator port 41 and the first installation piece 33 in the circumferential direction. The air-conditioning port 66 bulges in a direction of the radial direction (direction of the radial direction different from the bulging direction of each of the radiator port 41 and the first installation piece 33) intersecting each other in the bulging direction of the radiator port 41 and the first installation piece 33. As illustrated in FIG. 7, the air-conditioning port 66 is formed between the above-described bypass port 55 and the warming port 56 in the axial direction. In the embodiment, a center portion of the air conditioning port 66 in the axial direction and a center portion of the above-described connecting portion 57 in the axial direction are disposed at the same position in the axial direction. An outer diameter of the air-conditioning port 66 is formed to be larger than a distance between the bypass outlet port 55a and the warming outlet port 56a in the axial direction.

An air conditioning outlet port 66a passing through the air-conditioning port 66 in the radial direction is formed in the air conditioning port 66. In the embodiment, an inner diameter of the air-conditioning outlet port 66a is formed to be equal to an axial width (interval between the bypass outlet port 55a and the warming outlet port 56a) of the above-described connecting portion 57. However, the inner diameter of the air-conditioning outlet port 66a can be appropriately changed.

As illustrated in FIG. 4, an air-conditioning joint 68 is connected to an opening end surface (radially outer end surface) of the air conditioning port 66. The air-conditioning joint 68 connects the air-conditioning port 66 and an upstream end of the above-described air-conditioning flow path 14 (refer to FIG. 1). The air-conditioning joint 68 protrudes radially outward from the opening end surface of the air conditioning port 66. Further, the air-conditioning joint 68 is welded (for example, vibration welding, or the like) to the opening end surface of the air conditioning port 66.

(Drive Unit)

As illustrated in FIG. 2, the drive unit 23 is installed on the bottom wall portion 32 of the casing main body 25. The drive unit 23 is configured by accommodating a motor, a speed reduction mechanism, a control board, and so on, which are not illustrated, in a drive case 71.

(Valve)

As illustrated in FIGS. 3 and 4, the valve 22 is accommodated in the casing 21. The valve 22 is formed in a cylindrical shape disposed coaxially with the axis O of the casing 21. By rotating around the axis O, the valve 22 opens and closes each of the above-described outlet ports (the radiator outlet port 41b, the bypass outlet port 55a, the warming outlet port 56a, and the air-conditioning outlet port 66a). Further, the valve 22 is formed of, for example, a resin material or the like.

The valve 22 mainly includes a rotating shaft 81, a hollow cylindrical valve cylinder portion 82 which surrounds the rotating shaft 81, and spoke portions 83 to 85 which connect the rotating shaft 81 and the valve cylinder portion 82.

As illustrated in FIG. 5, the rotating shaft 81 extends coaxially with the axis O. A portion of the rotating shaft 81 on the first end side is rotatably supported by a first bush 88 provided on the above-described bottom wall portion 32. The first bush 88 is fitted into a through-hole 32a passing through the bottom wall portion 32 in the axial direction. A portion of the rotating shaft 81 on the first end side passes through the bottom wall portion 32 in the axial direction via the through-hole 32a. The portion of the rotating shaft 81 on the first end side is connected to the above-described drive unit 23 outside the casing 21. Therefore, power of the drive unit 23 is transmitted to the rotating shaft 81. Further, as illustrated in FIG. 3, a seal ring 89 which seals between an inner surface of the through-hole 32a and an outer circumferential surface of the rotating shaft 81 is provided to the rotating shaft 81 on the first end side at the portion which is located on the second end side in the axial direction with respect to the above-described first bush 88.

A portion of the rotating shaft 81 on the second end side is rotatably supported by a second bush 91 provided on the above-mentioned cover body 26.

Figure 8:
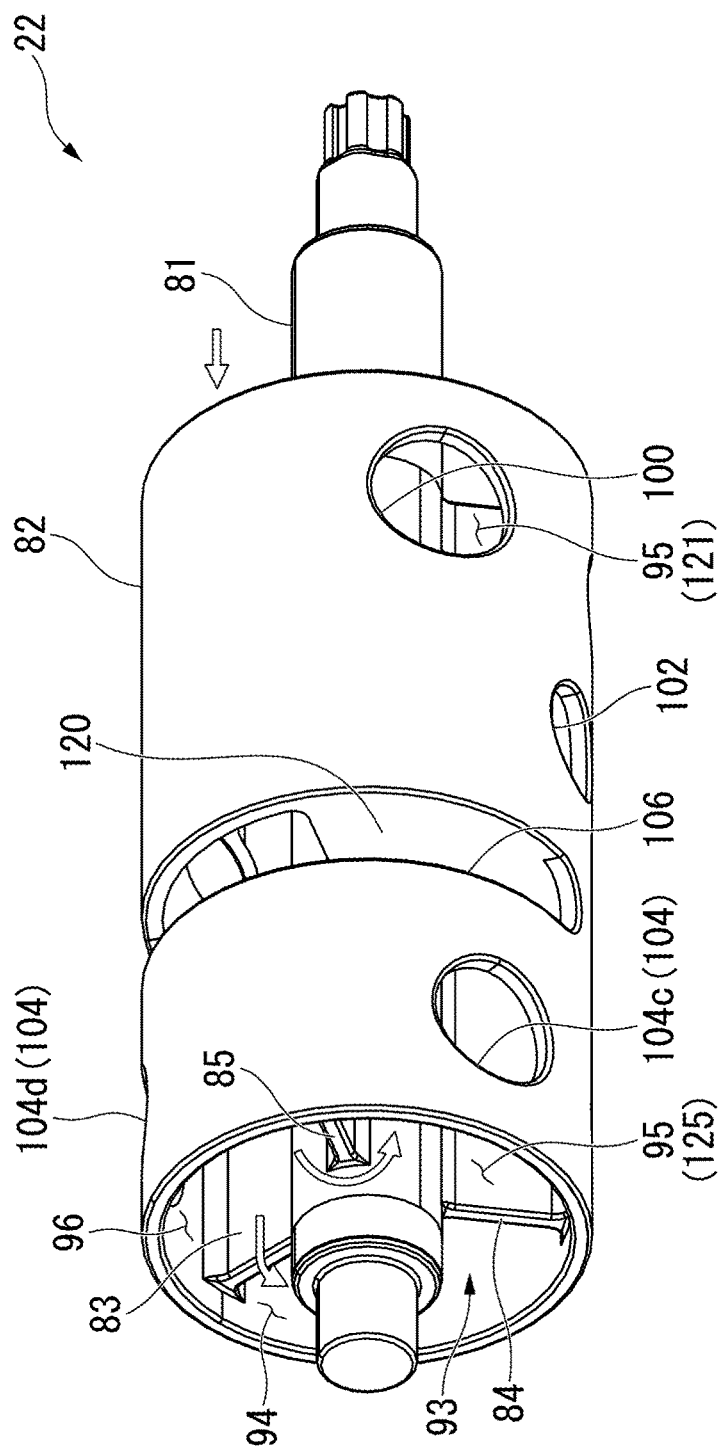
FIG. 8 is a perspective view of the valve according to the embodiment as seen from the second end side in the axial direction.

FIG. 8 is a perspective view of the valve 22 as seen from the second end side in the axial direction.

As illustrated in FIG. 8, the spoke portions 83 to 85 protrude radially from the outer circumferential surface of the rotating shaft 81 with respect to the axis O. In the embodiment, three spoke portions 83 to 85 (a first spoke portion 83, a second spoke portion 84, and a third spoke portion 85) are formed, for example, at intervals of 120° in the circumferential direction.

As illustrated in FIGS. 5, 7 and 8, each of the spoke portions 83 to 85 extends axially from a portion of the rotation shaft 81 except both ends thereof in the axial direction. In the embodiment, edges of the spoke portions 83 to 85 on the first end side in the axial direction are located at a position which is closer to the second end side in the axial direction in relation to the fail opening 41a and is closer to the first end side in the axial direction in relation to the radiator outlet port 41b.

The valve cylinder portion 82 is disposed coaxially with the axis O. Radially outer ends of the spoke portions 83 to 85 are connected to an inner circumferential surface of the valve cylinder portion 82. An inside of the valve cylinder portion 82 configures a flow path 93 through which the cooling water flowing into the casing 21 through the inlet port 37a flows in the axial direction. As illustrated in FIGS. 4 and 8, the flow path 93 is divided into a plurality of flow paths (a first flow path 94, a second flow path 95 and a third flow path 96) in the circumferential direction by the above-described spoke portions 83 to 85. Specifically, the first flow path 94 is partitioned off in the circumferential direction by the first spoke portion 83 and the second spoke portion 84. The second flow path 95 is partitioned off in the circumferential direction by the second spoke portion 84 and the third spoke portion 85. The third flow path 96 is partitioned off in the circumferential direction by the first spoke portion 83 and the third spoke portion 85. In addition, as illustrated in FIG. 5, a portion of the casing 21 which is located on the first end side in the axial direction in relation to the valve cylinder portion 82 and the spoke portions 83 to 85 configures a connection flow path 98 communicating with the flow path 93.

Figure 9:
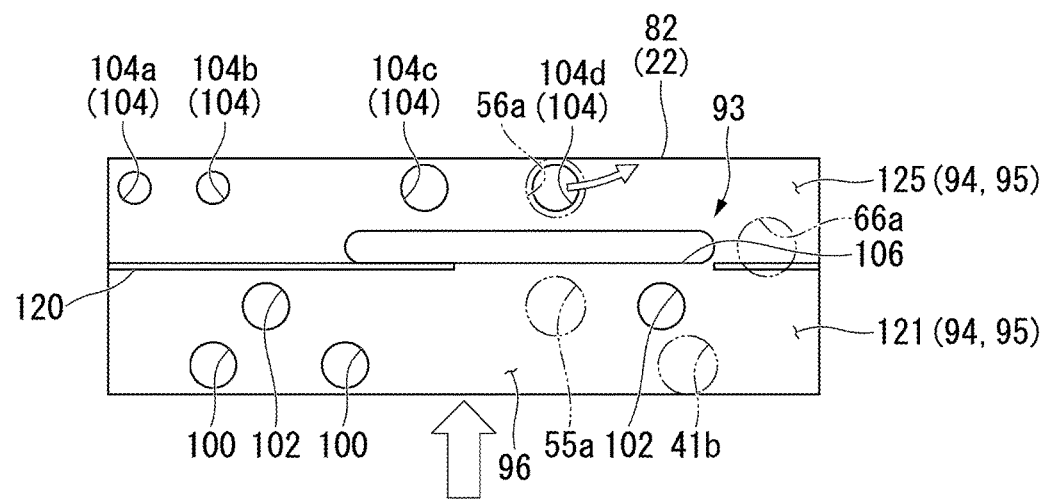
FIG. 9 is a developed view of a valve cylinder portion according to the embodiment.

FIG. 9 is a developed view of the valve cylinder portion 82.

As illustrated in FIGS. 8 and 9, in the valve cylinder portion 82, a radiator communication port 100 passing through the valve cylinder portion 82 in the radial direction is formed at the same position as that of the above-described radiator outlet port 41b in the axial direction. When at least a part of the radiator communication port 100 overlaps with the radiator outlet port 41b as seen from the radial direction, the radiator communication port 100 communicates the radiator outlet port 41b and an inside of the flow path 93 through the radiator communication port 100. In the embodiment, the radiator communication port 100 is formed as a round hole. For example, two radiator communication ports 100 are formed at intervals in the circumferential direction.

In the valve cylinder portion 82, a bypass communication port 102 passing through the valve cylinder portion 82 in the radial direction is formed at the same position as that of the above-described bypass outlet port 55a in the axial direction. When at least a part of the bypass communication port 102 overlaps with the bypass outlet port 55a as seen from the radial direction, the bypass communication port 102 communicates the bypass outlet port 55a and the inside of the flow path 93 through the bypass communication port 102. In the embodiment, the bypass communication port 102 is formed in a round hole. For example, two bypass communication ports 102 are formed at intervals in the circumferential direction.

In the valve cylinder portion 82, a warming communication port 104 passing through the valve cylinder portion 82 in the radial direction is formed at the same position as the above-described warming outlet port 56$a$ in the axial direction. When at least a part of the warming communication port 104 overlaps with the warming outlet port 56$a$ as seen from the radial direction, the warming communication port 104 communicates the warming outlet port 56$a$ and the inside of the flow path 93 through the warming communication port 104. In the embodiment, the warming communication port 104 is formed in a round hole. For example, four warming communication ports 104 are formed at intervals in the circumferential direction.

In the valve cylinder portion 82, an air-conditioning communication port 106 passing through the valve cylinder portion 82 in the radial direction is formed at the same position as the above-described air-conditioning outlet port 66$a$ in the axial direction. When at least a part of the air-conditioning communication port 106 overlaps with the air-conditioning outlet port 66$a$ as seen from the radial direction, the air-conditioning communication port 106 communicates the air-conditioning outlet port 66$a$ and the inside of the flow path 93 through the air-conditioning communication port 106. The air-conditioning communication port 106 is formed as an elongated hole of which a long-length direction is a circumferential direction. In the embodiment, the air-conditioning communication port 106 is formed to straddle the third spoke part 85 in the circumferential direction.

An opening width of the air conditioning communication port 106 in the axial direction is formed to be narrower than an axial interval between the bypass outlet port 55$a$ and the warming outlet port 56$a$. Therefore, the air-conditioning communication port 106 is configured not to communicate with the bypass outlet port 55$a$ and the warming outlet port 56$a$. Further, the opening width of the air-conditioning communication port 106 in the axial direction is formed to be smaller than an inner diameter of the above-described air-conditioning outlet port 66$a$.

As the valve 22 rotates around the axis O, the valve 22 switches communication and shut-off between the inside of the flow path 93 and each of the outlet ports 41$b$, 55$a$, 55$b$ and 66$a$. The cooling water flowing into the casing 21 is distributed to each of the flow paths 11 to 15 through one of the outlet ports which communicates with the communication port. A communication pattern between the outlet ports and the communication port can be appropriately set. A layout of the outlet ports and the communication port can be changed according to a set communication pattern.

As illustrated in FIG. 3, a seal mechanism 110 which seals between an outer circumferential surface of the valve cylinder portion 82 and an inner circumferential surface of the casing main body 25 is provided in the above-described radiator outlet port 41$b$. The seal mechanism 110 has a sliding ring 111, a seal ring 112, and a biasing member 113.

The sliding ring 111 is inserted into the radiator outlet port 41$b$. A radially inner end surface of the sliding ring 111 is slidably in contact with the outer circumferential surface of the valve cylinder portion 82. Further, in the embodiment, the radially inner end surface of the sliding ring 111 is a curved surface formed along a curvature radius of the valve cylinder portion 82.

The seal ring 112 is, for example, a U packing. The seal ring 112 is externally fitted to the sliding ring 111. An outer circumferential surface of the seal ring 112 is slidably in close contact with an inner circumferential surface of the radiator outlet port 41$b$.

The biasing member 113 is interposed between a radially outer end surface of the sliding ring 111 and the flange portion 43 of the radiator joint 42. The biasing member 113 is, for example, a wave spring. The biasing member 113 biases the sliding ring 111 inward in the radial direction (toward the valve cylinder portion 82).

In addition, a seal mechanism 110 having the same structure as that of the seal mechanism 110 provided in the radiator outlet port 41$b$ is also provided in the bypass outlet port 55$a$, the warming outlet port 56$a$ and the air-conditioning outlet port 66$a$. In the embodiment, the seal mechanism 110 provided in the bypass outlet port 55$a$, the warming outlet port 56$a$ and the air-conditioning outlet port 66$a$ is designated by the same reference numeral as that of the seal mechanism 110 provided in the radiator outlet port 41$b$, and the description thereof will be omitted.

As illustrated in FIG. 5, a restriction wall portion 120 which closes a part of the flow path 93 is formed in a portion of the valve 22 located between the bypass communication port 102 and the air-conditioning communication port 106 in the axial direction. As illustrated in FIG. 4, the restriction wall portion 120 closes an area of about ⅔ of the above-described flow path 93 in the circumferential direction. In the embodiment, the first flow path 94 and the second flow path 95 among the flow paths 94 to 96 forming the flow path 93 are partitioned into the first end side and the second end side in the axial direction by the restriction wall section 120. As illustrated in FIG. 5, a region of the first flow path 94 and the second flow path 95 on the first end side of the restriction wall section 120 configures a communication flow path 121 directly communicating with the above-described connection flow path 98. On the other hand, a region of the first flow path 94 and the second flow path 95 on the second end side of the restriction wall part 120 configures a return flow path 125 in which the cooling water flowing through the third flow path 96 flows after being returned at portions of the spoke portions (for example, the first spoke part 83 and the third spoke portion 85) on the second end side in the axial direction. The restriction wall portion 120 restricts the flow of the cooling water flowing into the return flow path 125 to the first end side in the axial direction.

As illustrated in FIG. 9, in the embodiment, each of the above-described radiator communication ports 100 communicates with, for example, the communication flow path 121 in the first flow path 94 and the second flow path 95 described above, respectively.

In each of the bypass communication ports 102, for example, one bypass communication port 102 communicates with an inside of the communication flow path 121, and the other bypass communication port 102 communicates with an inside of the third flow path 96.

For example, a part of the air-conditioning communication port 106 communicates with an inside of the return flow path 125, and the remaining portion thereof communicates with the inside of the third flow path 96.

Each of the warming communication ports 104, for example, three warming communication ports 104$a$ to 104$c$ communicate with the inside of the return flow path 125. On the other hand, among each of the warming communication ports 104, for example, the remaining one warming communication port 104$d$ communicates with the inside of the third flow path 96. Further, Each of the warming communication ports 104, at least the warming communication port 104 (for example, the warming communication port 104$b$)

which is in a valve-open state at the same timing as the radiator communication port 100 may communicate with the inside of the return flow path 125. In the flow path 93, a flow path cross-sectional area other than the portion closed by the restriction wall portion 120 (flow path cross-sectional area of the third flow path 96) can be changed appropriately when being set to be equal to or larger than an opening area of any of the warming communication ports 104.

[Operation]

Next, an operation of the above-described control valve 8 will be described. In the following description, for example, a flow of the cooling water in the communication pattern illustrated in FIG. 10 will be mainly described. That is, in the communication pattern illustrated in FIG. 10, the radiator outlet port 41b communicates with the inside of the flow path 93 (the communication flow path 121) through the radiator communication port 100. The warming outlet port 56a communicates with the inside of the flow path 93 (the return flow path 125) through the warming communication port 104b. The air-conditioning outlet port 66a communicates with the inside of the flow path 93 (the return flow path 125) through the air-conditioning communication port 106.

As illustrated in FIG. 1, in the main flow path 10, the cooling water delivered by the water pump 3 exchanges heat in the engine 2 and then flows toward the control valve 8. As illustrated in FIG. 5, the cooling water having passed through the engine 2 in the main flow path 10 flows through the inlet port 37a into the connection flow path 98 in the casing 21.

As illustrated in FIG. 6, from the cooling water flowing into the connection flow path 98, some of the cooling water passes through the fail opening 41a and then flows into the EGR outlet port 51a of the EGR port 51. The cooling water flowing into the EGR outlet port 51a passes through the EGR joint 52 and is supplied to the EGR flow path 15. The cooling water supplied to the EGR flow path 15 is returned to the main flow path 10 after heat exchange between the cooling water and the EGR gas is performed in the EGR cooler 7.

Figure 10:
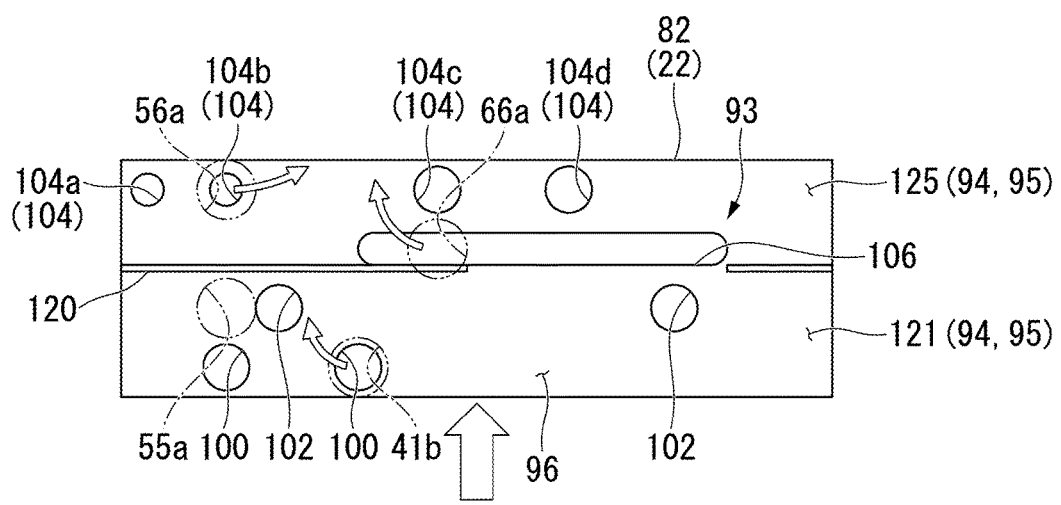
FIG. 10 is a developed view of the valve cylinder portion according to the embodiment.

Meanwhile, as illustrated in FIG. 5, from the cooling water flowing into the connection flow path 98, the cooling water which has not flowed into the EGR outlet port 51a flows from the first end side in the axial direction into the flow path 93 (the third flow path 96 and the communication flow path 121). The cooling water flowing into the flow path 93 is distributed to each of the outlet ports in a process of flowing in the flow path 93 in the axial direction. Specifically, as illustrated in FIGS. 5 and 10, from the cooling water flowing through the flow path 93, some of the cooling water flows into the radiator communication port 100 at a time point of reaching the radiator port 41. The cooling water flowing into the radiator communication port 100 passes through the radiator outlet port 41b and flows into the radiator communication portion 44b of the radiator joint 42. The cooling water flowing into the radiator communication portion 44b flows in the merging portion 44c and is then supplied to the radiator flow path 11. The cooling water supplied to the radiator flow path 11 is returned to the main flow path 10 after heat exchange with the radiator 4 is performed.

From the cooling water which has passed through the radiator port 41 in the flow path 93, the cooling water flowing in the communication flow path 121 (the first flow path 94 and the second flow path 95) is restricted from flowing to the second end side in the axial direction by the restriction wall portion 120. Meanwhile, as illustrated in FIGS. 8 and 10, from the cooling water which has passed through the radiator port 41 in the flow path 93, the cooling water flowing in the third flow path 96 is returned to the first end side in the axial direction at portions of the spoke portions 83 and 85 on the second end side (a flowing direction of the cooling water is changed).

Therefore, as illustrated in FIGS. 5 and 10, the cooling water flows into the return flow path 125. The cooling water flowing into the return flow path 125 reaches the warming port 56. Then, the cooling water passes through the warming communication port 104b of the warming communication ports 104 which communicates with the warming outlet port 56a and flows into the warming outlet port 56a. The cooling water flowing into the warming outlet port 56a passes through the warming joint 62 and is supplied to the warming flow path 13. The cooling water supplied to the warming flow path 13 is returned to the main flow path 10 after heat exchange with the engine oil is performed in the oil warmer 5.

From the cooling water flowing in the return flow path 125, the cooling water having passed through the warming port 56 reaches the air-conditioning port 66. Then, the cooling water passes through the air-conditioning communication port 106 and flows into the air-conditioning outlet port 66a. The cooling water flowing into the air-conditioning outlet port 66a passes through the air-conditioning joint 68 and is supplied to the air-conditioning flow path 14. The cooling water supplied to the air-conditioning flow path 14 is returned to the main flow path 10 after heat exchange with the air-conditioning air is performed in the heater core 6. Further, in the communication pattern illustrated in FIG. 10, the air-conditioning communication port 106 may communicate with the inside of the third flow path 96. That is, the cooling water may be distributed to the air-conditioning communication port 106 in a process of flowing in the third flow path 96.

Here, in the return flow path 125, the flow of the cooling water to the first end side in the axial direction is restricted by the restriction wall portion 120 (the flowing direction is changed). Therefore, from the cooling water which has flowed into the return flow path 125, the cooling water which has not been supplied to the warming flow path 13 or the air-conditioning flow path 14 stays in the return flow path 125.

The above is the flow of the cooling water in the control valve 8 in the communication pattern illustrated in FIG. 10.

In the control valve 8, the valve 22 is rotated around the axis O to change the communication pattern between the outlet ports and the communication port. By stopping the rotation of the valve 22 at a position corresponding to the communication pattern to be set, the outlet ports and the communication port communicate with each other in the communication pattern corresponding to the stopped position of the valve 22. For example, in the communication pattern illustrated in FIG. 9, only the warming outlet port 56a communicates with the inside of the flow path 93 through the warming communication port 104d. From the cooling water flowing into the flow path 93, the cooling water flowing in the third flow path 96 is supplied from the warming outlet port 56a to the warming flow path 13 through the warming communication port 104d.

In the control valve 8 of the embodiment, when the temperature of the cooling water is excessively increased during occurrence of an abnormality, the cooling water is supplied to the radiator flow path 11 through the fail opening 41a. Specifically, when the temperature of the cooling water flowing into the casing 21 reaches a predetermined temperature or more, the wax of the thermostat 45 thermally expands, and thus the valve body moves in a valve opening direction. Therefore, the fail opening 41a enters the valve-open state. When the fail opening 41a is in the valve-open state, the cooling water in the connection flow path 98 flows into the fail communication portion 44a through the fail opening 41a. The cooling water flowing into the fail communication portion 44a flows through the inside of the merging portion 44c and is then supplied to the radiator flow path 11. Accordingly, regardless of the communication pattern (regardless of the opening and closing of the radiator outlet port 41b), the cooling water can be supplied to the radiator flow path 11.

As described above, in the embodiment, the warming communication port 104 is configured to be open in the return flow path 125 to which the third flow path 96 returns.

According to the configuration, since the cooling water is returned at the portions of the spoke parts 83 and 85 on the second end side in the axial direction, a pressure loss in a portion of the inside of the flow path 93 from the radiator communication port 100 to the warming communication port 104 increases. Therefore, it is possible to make it difficult for the cooling water to flow to a downstream side in relation to the radiator communication port 100, and thus it is possible to positively introduce the cooling water into the radiator communication port 100. Accordingly, it is also possible to effectively introduce the cooling water into the communication port on the upstream side particularly when a plurality of communication ports and outlet ports communicate with each other. As a result, it is possible to distribute a desired flow rate of cooling water to each of the communication ports and the outlet ports.

In addition, in the embodiment, since the above-described operational effects are created by changing the flowing direction of the cooling water, it is possible to minimize an increase in size of the control valve 8 as compared with, for example, the case in which the radiator communication port 100 is formed to be larger than the warming communication port 104.

In the embodiment, since the spoke portions 83 to 85 extend in the axial direction inside the valve cylinder portion 82, it is possible to increase the pressure loss caused by a pipe friction generated when the cooling water flows through the flow path 93. Therefore, the above-described operational effects can be achieved more successfully.

In the present embodiment, the restriction wall portion 120 for restricting the flow of the cooling water to the first end side is provided at the flow path 93 on the first end side in the axial direction in relation to the air conditioning communication port 106.

According to the configuration, in the return flow path 125, the flow of the cooling water to the first end side in the axial direction in relation to the restriction wall portion 120 is restricted by the restriction wall portion 120. Therefore, the pressure loss in the return flow path 125 can be increased. Accordingly, even when a plurality of communication ports and outlet ports communicate with each other as described above, it is possible to effectively introduce the cooling water into the communication port on the upstream side.

In the embodiment, since the flow path cross-sectional area of the third flow path 96 is set to be equal to or larger than the opening area of any of the warming communication ports 104, the flow rate of the cooling water flowing into a return space 125 can be secured. Therefore, it is possible to more reliably distribute a desired flow rate of cooling water to each of the communication ports and the outlet ports.

In the present embodiment, the radiator communication port 100 is connected to the radiator flow path 11. Therefore, particularly, even when a plurality of communication ports and outlet ports communicate with each other, it is possible to effectively introduce the cooling water into the radiator 4.

In the embodiment, in the casing 21 in which the surface area of the circumferential wall portion 31 is larger than the surface area of the bottom wall portion 32 or the cover body 26, each of the communication ports passes through the valve cylinder portion 82 in the radial direction, and each of the outlet ports passes through the casing 21 in the radial direction.

According to this configuration, it is possible to ensure a wide space for forming each communication port and each outlet port in the circumferential wall portion 31 or the valve cylinder portion 82. Therefore, it is possible to improve layout properties for each of communication ports and each of outlet ports, as compared with, for example, a case in which each communication port and each outlet port passes through the valve cylinder portion 82 and the casing 21 in the axial direction, respectively.

Although the preferred embodiments of the present invention have been described above, the present invention is not limited to the embodiments. Additions, omissions, substitutions and other changes in the constitution are possible without departing from the scope of the present invention. The present invention is not limited by the foregoing description and is limited only by the scope of the appended claims.

For example, in the above-described embodiment, the configuration in which the control valve 8 is mounted in the cooling system 1 of the engine 2 has been described, but the present invention is not limited to the configuration, and the control valve 8 may be mounted in other systems.

In the above-described embodiment, the configuration in which the cooling water flowing into the control valve 8 is distributed to the radiator flow path 11, the bypass flow path 12, the warming flow path 13, the air-conditioning flow path 14 and the EGR flow path 15 has been described, but the present invention is not limited to this configuration. The control valve 8 may be configured to distribute the cooling water flowing into the control valve 8 into at least two flow paths.

A layout, a type, a shape or the like of each communication port and each outlet port can be appropriately changed.

In the above-described embodiment, the constitution in which each joint is welded to the opening end surface of each flow port has been described, but the present invention is not limited to this configuration, and each joint may be fixed to the opening end surface of each flow port by other methods (for example, adhesion, fastening, and so on).

In the above-described embodiment, for example, the configuration in which the inlet port, each communication port and each outlet port pass through the valve cylinder portion 82 and the casing 21 in the radial direction have been described, but the present invention is not limited to this configuration. For example, each communication port and each outlet port may pass through the valve cylinder portion 82 and the casing 21 in the axial direction, respectively.

In the above-described embodiment, the configuration having the spoke portions 83 and 85 and the restriction wall portion 120 as a flowing direction changing portion for changing the flowing direction of the cooling water has been described, but the present invention is not limited to this configuration. That is, the warming communication port 104 does not have to communicate with the return flow path 125.

Figure 11:
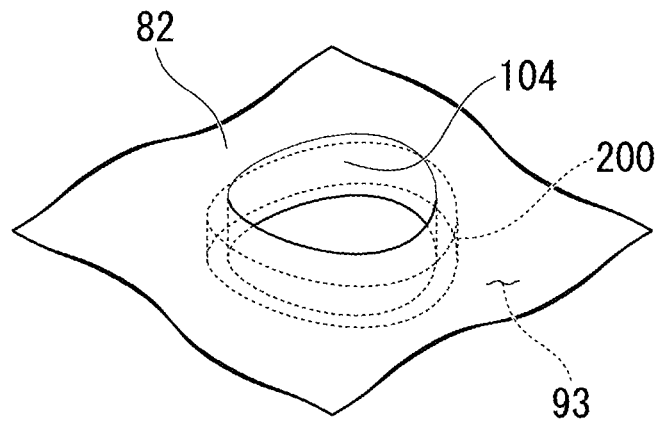
FIG. 11 is a partial perspective view of a valve cylinder portion according to a modified example of the embodiment.

For example, in the valve cylinder portion 82 illustrated in FIG. 11, a return wall portion 200 extending radially inward from an edge of the opening of the warming communication port 104 is formed. According to this constitution, the cooling water flowing through the flow path 93 flows around the turn wall portion 200 and flows into the warming communication port 104. Therefore, it is possible to increase the pressure loss in the portion of the inside of the flow path 93 leading to the warming communication port 104 and to positively introduce the cooling water into the radiator communication port 100. Further, the turn wall portion 200 may surround an entire circumference of the warming communication port 104 or may be formed at a part of the edge of the opening of the warming communication port 104.

Figure 12:
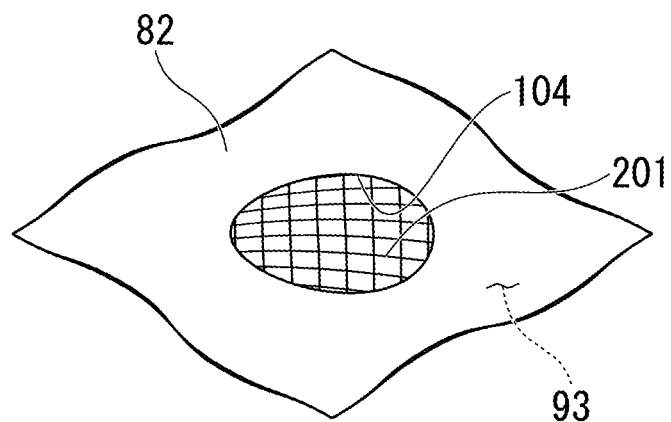
FIG. 12 is a partial perspective view of the valve cylinder portion according to a modified example of the embodiment.

A mesh member 201 which covers the warming communication port 104 is provided in the valve cylinder portion 82 illustrated in FIG. 12. According to this configuration, when the cooling water passes through the warming communication port 104, the flowing direction of the cooling water is changed by the mesh member 201 being avoided. Therefore, it is possible to increase the pressure loss when passing through the warming communication port 104 and to positively introduce the cooling water into the radiator communication port 100.

As the flowing direction changing portion, for example, a meandering flow path may be formed in a portion of the flow path 93 from the air-conditioning communication port 106 to the warming communication port 104.

In the above-described embodiment, the flow path 93 is configured to extend an inside of the valve cylinder portion 82 in the axial direction, but the present invention is not limited to this configuration. The flow path may be with any configuration as long as the inlet port 37*a* and each communication port communicate with each other.

In the above-described embodiment, the configuration in which the restriction wall portion 120 is formed in the portion of the valve 22 located between the bypass communication port 102 and the air-conditioning communication port 106 in the axial direction has been described, but the present invention is not limited to this configuration. The restriction wall portion 120 may be formed at least between the radiator communication port 100 and the warming-up communication port 104.

In the above-described embodiment, the case in which the downstream communication port serves as the warming communication port 104 and the downstream outlet port serves as the warming outlet port 56*a* has been described, but the present invention is not limited to this configuration.

In addition, it is possible to appropriately replace elements in the above-described embodiments with well-known elements without departing from the scope of the present invention, and the modified embodiments described above may be appropriately combined.

What is claimed is:

1. A control valve comprising:
a cylindrical casing having an inlet port for a fluid; and
a valve accommodated in the casing to be rotatable around an axis extending in an axial direction of the casing and having a flow path communicating with the inlet port to allow the fluid to flow therethrough,
wherein an upstream outlet port and a downstream outlet port passing through the casing are formed at intervals in the casing,
wherein an upstream communication port and a downstream communication port which respectively communicate between an inside of the flow path and the upstream outlet port and between the inside of the flow path and the downstream outlet port according to a rotational position of the valve are formed in the valve,
wherein a flowing direction changing portion for changing a flowing direction of the fluid in the flow path is provided in a portion of the flow path which is located on a downstream side in relation to the upstream communication port in the flowing direction of the fluid,
wherein the flow path has an upstream flow path through which the fluid flows from a first end side in the axial direction toward a second end side and which communicates with the upstream communication port, and a downstream flow path which is connected to a connecting portion of the upstream flow path on the second end side in the axial direction, through which the fluid flows from the second end side to the first end side in the axial direction, and which communicates with the downstream communication port, and
wherein the flowing direction changing portion includes a spoke which divides the flow path into the upstream flow path and the downstream flow path in a circumferential direction about the axis, the flowing direction being turned at the connecting portion between the upstream flow path and the downstream flow path; and
a restriction wall portion which is provided on the downstream side in the flow direction in relation to the downstream communication port so as to restrict the flow of the fluid to the first end side in the downstream flow path.

2. The control valve according to claim 1, wherein a flow path cross-sectional area of a portion of the flow path which is located between the upstream communication port and the downstream communication port is formed to be equal to or more than an opening area of the downstream communication port.

3. The control valve according to claim 1, wherein the upstream outlet port is configured to be connectable to a radiator of a vehicle.

4. The control valve according to claim 1, wherein each of the upstream outlet port and the downstream outlet port passes through the casing in a radial direction, and
each of the upstream communication port and the downstream communication port passes through the valve in the radial direction.

5. A control valve comprising:
a cylindrical casing having an inlet port for a fluid; and
a valve accommodated in the casing to be rotatable around an axis extending in an axial direction of the casing and having a flow path communicating with the inlet port to allow the fluid to flow therethrough,
wherein an upstream outlet port and a downstream outlet port passing through the casing are formed at intervals in the casing,
wherein an upstream communication port and a downstream communication port which respectively communicate between an inside of the flow path and the upstream outlet port and between the inside of the flow path and the downstream outlet port according to a rotational position of the valve are formed in the valve, and
wherein a return wall portion extending radially inward from at least a part of an edge of an opening of the downstream communication port is formed in the valve, the fluid in the flow path flowing around the return wall portion and flowing into the downstream communication port.

6. The control valve according to claim 5, wherein a flow path cross-sectional area of a portion of the flow path which is located between the upstream communication port and the downstream communication port is formed to be equal to or more than an opening area of the downstream communication port.

7. The control valve according to claim 5, wherein the upstream outlet port is configured to be connectable to a radiator of a vehicle.

\* \* \* \* \*